April 15, 1969  A. TEUFEL  3,438,685

RADIAL CAGE FOR CYLINDRICAL ROLLERS

Filed July 28, 1967

Inventor:
Anton Teufel
By
Hammond and Littell
Attorneys

United States Patent Office 3,438,685
Patented Apr. 15, 1969

3,438,685
RADIAL CAGE FOR CYLINDRICAL ROLLERS
Anton Teufel, Tubingen, Germany, assignor to Industriewerk Schaeffler OHG, Herzogenaurach, Germany, a corporation of Germany
Continuation-in-part of application Ser. No. 475,138, July 27, 1965. This application July 28, 1967, Ser. No. 656,915
Claims priority, application Germany, Aug. 28, 1964, J 26,469
Int. Cl. F16c *19/20, 33/49, 33/54*
U.S. Cl. 308—217            3 Claims

ABSTRACT OF THE DISCLOSURE

A radial cage for cylindrical rollers, particularly bearing needles, consisting of a thin-walled cylindrical jacket with pockets for the accommodation of the rollers, the flanges of the crossbars which define the pockets and are adapted to guide and/or to support two adjacent rollers, being deflected in a radially inward direction.

Prior application

This application is a continuation-in-part application of my copending, commonly assigned United States patent application Ser. No. 475,138, filed July 27, 1965 now abandoned.

Prior art

Roller cages of this type are known but the known cages have a number of disadvantages. Several types of these cages are constructed so that the pocket defining crossbars have radially inwardly directed flanges on both sides which assure the guidance and/or support of the rollers. The distance between each pair of adjoining rollers amounts to a multiple of the thickness of the sheet metal of the cage which has the disadvantage of not only limiting the number of rollers which can be accommodated in the cage but also limits its supporting capacity.

Moreover, the shortest distance between two adjoining crossbars in the prior art cages is measured so that the cage is supported on the rollers themselves without abutting against either of the two races. Controlling the cage in this manner has the disadvantage that where the bearing in operation rotates about an axis outside of the bearing axis, the cage clamps the rollers together due to the centrifugal forces being activated which, in turn, may cause the destruction of the entire bearing.

Objects of the invention

It is an object of the invention to provide a novel cage for cylindrical rollers which avoid the disadvantages of known cages.

This and other objects and advantages of the invention will become obvious from the following detailed description.

The invention

The cage of the invention for cylindrical rollers is comprised of a thin-walled cylindrical jacket with pockets formed by crossbars for accommodation of cylindrical rollers and the crossbars having along their length in peripheral direction a width greater than the thickness of the cage wall and having on one side only a radially inwardly directed flange, each flange having surfaces adapted to guide and/or support two adjacent cylindrical rollers. This cage has the advantage of containing an optimum number of rollers.

Another feature of the cage is that it is to be guided within its cylindrical periphery on the outer travel path of the rollers. This guidance of the roller cage on the center travel path or race is particularly of great value in installations where the bearing in operation rotates about an axis disposed outside of its own axis, as for example in piston rod bearings in combustion motors or in planetary gears. Because a very large surface of the cage is used for guidance in this type, exceptionally favorable conditions are obtained which do not permit the cage to enter the travel path as might happen when only narrow surfaces such as angular rims of the cage were used for the guidance.

The inwardly directed flanges of the crossbars preferably extend without interruption nearly across the entire length of the pockets which results in a distinct, hydrodynamic lubrication between the rollers and the deflected flanges.

In another embodiment of the invention, the deflected flanges extend over only a portion of the entire pocket length. This construction is advantageous when a particularly light weight cage is required to keep the concentrated forces as little as possible.

Referring now to the drawings.

Figure 1:
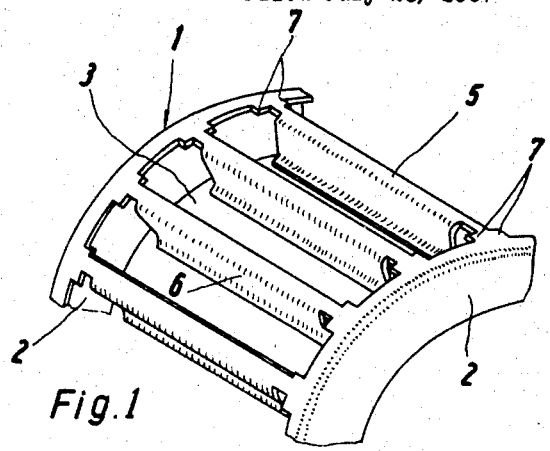
FIG. 1 is a partial perspective view of one embodiment of the cage of the invention.
Figure 2:
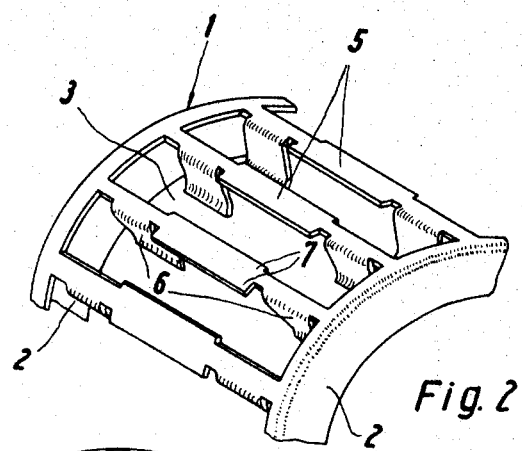
FIG. 2 is a partial perspective view of another embodiment of the cage of the invention.
Figure 3:
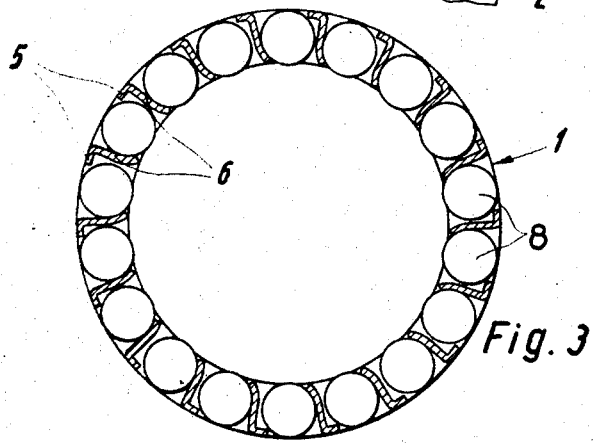
FIG. 3 is a cross-sectional view of the cage of FIG. 1 with cylindrical rollers therein.

In FIGS. 1, 2 and 3, the cage is comprised of a cylindrical jacket having at its ends radially inwardly directed edges 2. In the cylindrical portion of jacket 1 are pockets 3 to accommodate the rollers which are defined by crossbars 5 having flanges 6 directed radially inwardly and bar portions 7 which support two adjacent rollers 8 in a radially outwardly direction. In FIG. 1, the flanges 6 extend across almost the entire pocket length with bar portions 7 at the edges of the pocket length, while in FIG. 2 the flanges 6 are divided by bar portion members 7 and extend only across a portion of the pocket length.

Various modifications of the cages of the invention may be made without departing from the spirit or scope thereof and it is to be understood that the invention is to be limited only as defined in the appended claims.

I claim:
1. A cage for cylindrical rollers comprised of a one-piece thin-walled cylindrical jacket with pockets formed by crossbars for accommodation of cylindrical rollers and the crossbars having along their length in peripheral direction a width greater than the thickness of the cage wall and having on one side only a radially inwardly directed flange, the inner end of each flange being profiled to conform to the roller profile to provide bearing surface on each side and adapted to guide and/or support two adjacent cylindrical rollers.

2. The cage of claim 1 wherein the said flanges extend without interruption almost across the entire length of the pockets.

3. The cage of claim 1 wherein the said flanges extend only across a portion of the pocket length.

References Cited

UNITED STATES PATENTS 1,150,565    8/1915    Whitmer   ------------ 308—217

FOREIGN PATENTS 187,718    10/1922    Great Britain.
292,511    8/1928    Great Britain.
559,635    2/1944    Great Britain.

MARTIN P. SCHWADRON, *Primary Examiner.*
FRANK SUSKO, *Assistant Examiner.*